(12) United States Patent
Kleewein et al.

(10) Patent No.: US 7,917,499 B2
(45) Date of Patent: Mar. 29, 2011

(54) UPDATING ADAPTIVE, DEFERRED, INCREMENTAL INDEXES

(75) Inventors: James Charles Kleewein, Kirkland, WA (US); F. Soner Terek, Bellevue, WA (US); Narasimhan Sundararajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 11/427,974

(22) Filed: Jun. 30, 2006

(65) Prior Publication Data

US 2008/0005097 A1    Jan. 3, 2008

(51) Int. Cl.
    *G06F 17/30*    (2006.01)
(52) U.S. Cl. ........ 707/715; 707/696; 707/705; 707/711; 707/759
(58) Field of Classification Search ................. 707/1, 3, 707/5, 100, 104.1, 696, 705, 715, 711, 759
    See application file for complete search history.

(56) References Cited

U.S. PATENT DOCUMENTS

| | | | |
|---|---|---|---|
| 5,251,316 A | 10/1993 | Anick | |
| 5,685,003 A | 11/1997 | Peltonen | |
| 5,832,502 A | 11/1998 | Durham | |
| 5,848,410 A | 12/1998 | Walls | |
| 6,003,043 A | 12/1999 | Hatakeyama | |
| 6,047,286 A | 4/2000 | Burrows | |
| 6,571,239 B1 * | 5/2003 | Cole et al. .................... | 707/5 |
| 6,584,458 B1 | 6/2003 | Millett | |
| 6,598,059 B1 * | 7/2003 | Vasudevan et al. ........... | 707/203 |
| 6,772,141 B1 | 8/2004 | Pratt | |
| 7,010,521 B2 * | 3/2006 | Hinshaw et al. ............... | 707/3 |
| 7,016,913 B2 * | 3/2006 | Leong et al. ........... | 707/999.102 |
| 7,028,022 B1 | 4/2006 | Lightstone | |
| 7,047,250 B1 * | 5/2006 | Agarwal et al. ............... | 707/102 |
| 7,213,013 B1 * | 5/2007 | Subramaniam et al. .......... | 707/3 |
| 7,296,029 B2 | 11/2007 | Hall | |
| 7,313,581 B1 * | 12/2007 | Bachmann et al. ............ | 707/759 |
| 7,366,725 B2 * | 4/2008 | Jordan et al. ............... | 707/999.1 |
| 7,478,081 B2 * | 1/2009 | Hacigumus et al. ............. | 707/2 |
| 7,490,084 B2 * | 2/2009 | Kothuri et al. .......... | 707/999.008 |
| 2002/0065815 A1 | 5/2002 | Layden | |
| 2002/0143871 A1 | 10/2002 | Meyer | |
| 2003/0028506 A1 * | 2/2003 | Yu ..................... | 707/1 |
| 2003/0123443 A1 | 7/2003 | Anwar | |
| 2005/0289193 A1 * | 12/2005 | Arrouye et al. ............... | 707/200 |
| 2006/0031197 A1 | 2/2006 | Oral | |
| 2006/0036580 A1 * | 2/2006 | Stata et al. ......................... | 707/3 |
| 2006/0074977 A1 * | 4/2006 | Kothuri et al. ............. | 707/104.1 |
| 2007/0061487 A1 * | 3/2007 | Moore et al. ................... | 709/246 |

(Continued)

OTHER PUBLICATIONS

Brown; Fast Incremental Indexing for Full-Text Information Retrieval; Proceedings of the 20th VLDB Conference; 1994; 11 pgs; printed from http://ciir.cs.umass.edu/pubfiles/vldb94.pdf; Santiago, Chile.

(Continued)

*Primary Examiner* — Debbie Le
*Assistant Examiner* — Dangelino N Gortayo
(74) *Attorney, Agent, or Firm* — Senniger Powers LLP

(57) ABSTRACT

An index update component updates an index of a database in response to a query to the database referencing the index. An index control record tracks the last time the index was referenced and state of the index compared to the state of the database. An index deletion component deletes indexes in the database that have not been referenced for a period of time.

17 Claims, 5 Drawing Sheets

U.S. PATENT DOCUMENTS

2007/0073761 A1 3/2007 Anderson et al.
2007/0192372 A1 8/2007 Bestgen et al.
2007/0250517 A1* 10/2007 Bestgen et al. .............. 707/100

OTHER PUBLICATIONS

Shoens; Synthetic Workload Performance Analysis of Incremental Updates; 10 pgs; printed from http://delivery.acm.org/10.1145/190000/188594/p329-shoens.pdf?key1=188594&key2=5213085411&coll=GUIDE&dl=GUIDE&CFID=69996029&CFTOKEN=38552641; U.S., 1994.

Zobel; An Efficient Indexing Technique for Full-Text Database Systems; Proceedings of the 18th VLDB Conference; 1992; 11 pgs.; printed from http://www.vldb.org/conf/1992/P353.PDF; Vancouver, British Columbia, Canada.

Salton; A Vector Space Model for Automatic Indexing; Information Retrieval and Language Processing; Nov. 1975; 8 pgs; vol. 18, No. 11; printed from http://delivery.acm.org/10.1145/370000/361220/p613-salton.pdf?key1=361220&key2=0164085411&coll=portal&dl=ACM&CFID=69996643&CFTOKEN=63647390; Association for Computing Machinery; U.S.

* cited by examiner

UPDATING ADAPTIVE, DEFERRED, INCREMENTAL INDEXES

BACKGROUND

In existing messaging systems such as electronic mail systems, key performance metrics are human interactive response time and message throughput. Interactive response time is the time it takes the system to respond to the demands placed on it by a user. Message throughput is how efficiently the system can process demands from the user as well as handling all asynchronous interactions such as receiving and sending mail from other users.

To improve human response time, current systems utilize indexing. An index is an auxiliary access structure of the database that physically organizes part of the data in such a way that it can be quickly and efficiently accessed in a certain pattern. Messaging data is accessed in many different patterns, such as displaying the contents of a folder containing recently received mail (inbox), searching for mail from certain person, or looking for mail that has been previous classified into some category or stored in a folder.

Because there are many different access patterns for messaging data, there may be many different indexes over the same data. And, an index that provides fast access to data in the inbox most often will not provide fast search for all mail from a certain person. As the amount of data stored in the messaging systems grows, the indexes become absolutely essential for maintaining acceptable response times.

While indexes are essential, they do suffer from several serious draw-backs. First, to keep the indexes for the messaging data current, the indexes are synchronously maintained as the data is modified, added to, or deleted from. For example, as data is added to the messaging data, the indexes are updated to reflect the new data; as data is deleted from the messaging data, the indexes are updated to reflect the data removed data; and, as the messaging data is updated, the indexes are updated to reflect the updated values of the data. As the rate of change of the messaging data increases, or as the number of indexes to be maintained increases, the cost of keeping the indexes current becomes problematic. Current messaging systems often spend over 40% of their input/output (I/O) operations doing nothing more than maintaining these indexes.

Second, the access pattern at data modification time, when the indexes are updated, cannot match all the access patterns indexed. Therefore, the I/O necessary to maintain those indexes are often effectively random relative to the data modification itself.

Next, indexes are maintained even if they are not being used. For example, suppose a user wants to sort their data on three different properties (sort on who it was from, when it was received, and what is the subject) because that will allow them to find a particular message quickly because they remember who it was from, roughly when it was received relative to other messages from the same person, and they will recognize the subject when they see it. To sort the data in that way, an index may be created, used once, and never used again. For some period after it is created, the index is maintained.

Lastly, indexes must be explicitly created, modified, or destroyed by a knowledgeable user because the absence of an index will cause unacceptable performance characteristics (e.g. interactive response time and message throughput) and the presence of an unused index causes unacceptable load on the system. Such users are very expensive because the amount of knowledge and experience necessary to balance on the edge of the 'too few is bad, but too many is bad' knife is significant, and hence the number of people who can do it are very rare, and in high demand.

SUMMARY

Embodiments of the invention include systems and methods for adaptive, incremental, deferred database indexing. In an embodiment, an index is updated in response to a query to the database. The index is updated if the state of the index is different than the state of the database.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
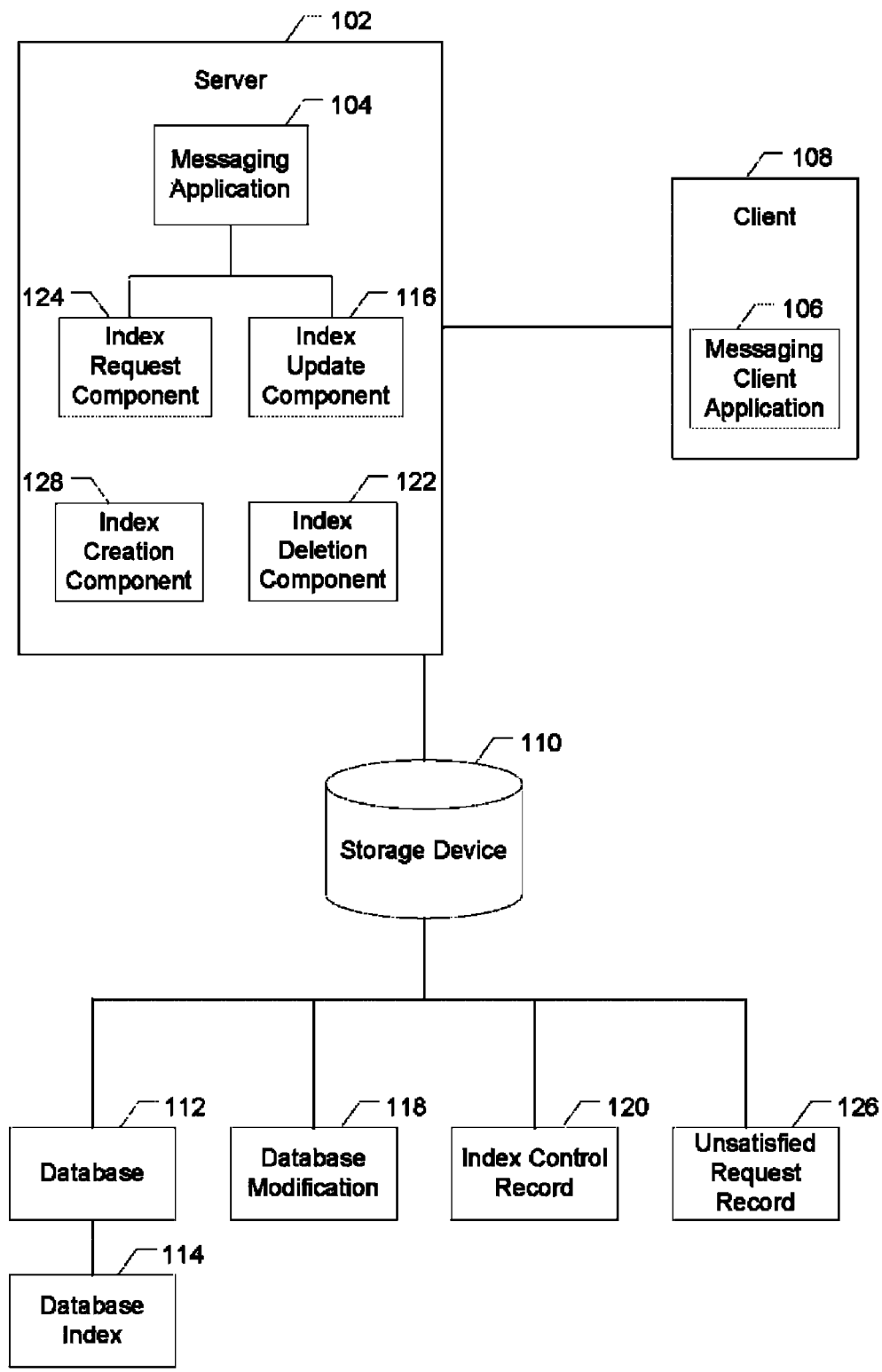
FIG. 1 is a block diagram illustrating one example of a suitable computing system environment in which the invention may be implemented.

FIG. 1 illustrates an exemplary embodiment of one system for incrementally updating and creating indexes 114 according to the invention. In one embodiment of the invention, a computer such as a server 102 is suitable for use in the other figures illustrated and described herein. Server 102 has one or more processors or processing units and a system memory. The server 102 hosts an electronic messaging application 104. For convenience, the invention is described in the electronic messaging context, but it should not be limited to such an embodiment.

The server 102 typically has at least some form of computer readable media. Computer readable media, which include both volatile and nonvolatile media, removable and non-removable media, may be any available medium that may be accessed by server 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 102.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In one embodiment, a user accesses the electronic messaging application 104 through a messaging client application 106 executed on a client computer 108. The server 102 may operate in a networked environment using logical connections to one or more remote computers, such as a remote computer 108. The remote computer 108 may be a personal computer, a server, a router, a network PC, a peer device, a handheld device, a personal digital assistant (PDA) or other common network node, and typically includes many or all of the elements described above relative to server 102. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

The electronic messaging application 104 has access to a storage device 110 containing a messaging database 112 and one or more indexes 114 associated with the messaging database 112. In another embodiment, a cluster of servers provide a single database image or a single database virtualization of the messaging database 112. The server 102 may also include other removable/non-removable, volatile/nonvolatile computer storage media. For example, FIG. 1 illustrates the storage device 110 that reads from or writes to non-removable, nonvolatile magnetic media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The messaging database 112 contains messages and data associated with the electronic messaging application 104. Additionally, the electronic messaging application 104 has access to an index update component 116 and an index request component 124. The drives or other mass storage devices and their associated computer storage media discussed above and illustrated in FIG. 1, provide storage of computer readable instructions, data structures, program modules and other data for the server 102. In FIG. 1, for example, storage device 110 is illustrated as storing application programs 104, other program modules or components 124, 116, 128, 122 and data 112, 114, 118, 120, 126.

The user accesses the messaging data through queries that reference an index 114 of the messaging database 112 via the email client application 106. In one embodiment, queries include one or more of the following: a database query, a database search, a database interrogation, a searched update and other database accesses. The searched update is a request to update the database based on a search. For example, for the searched update "delete any messages Sam has received from Bob", the database is searched for messages from Bob received by Sam and the messages identified by the search are deleted.

When the query is received by the electronic messaging application 104 on the server 102, the index update component 116 determines if the referenced index 114 is current. If the index 114 is current, the query is submitted to the messaging database 112 and control is returned to the electronic messaging application 104. In another embodiment, the query is modified so that the index 114 is utilized when the query is submitted to the messaging database 112. Thus, in this embodiment, the query is modified to force use of the index 114. Advantageously, the system is database vender neutral because the index 114 is created by using the messaging database 112, but the index 114 is independent of the messaging database 112.

If the index 114 is not current, the index update component 116 updates the index 114 before submitting the query to the messaging database 112. Advantageously, the index update component 116, updates the indexes 114 at the time they are referenced and not at the time the messaging database 112 is modified. Since this is the time the data is accessed, the index access path I/O is less random. Additionally, if an index is referenced infrequently or never referenced, system performance is not impacted because the index 114 is updated when referenced and not as modifications are applied to the messaging database 112. In another embodiment, the index update component 116 opportunistically and asynchronously updates the index 114 at times when it is not referenced. Advantageously, by executing the index update component 116 during periods of low database activity, the amount of maintenance necessary to update the index 114 at reference time is minimized using otherwise wasted system capacity. One skilled in the art recognizes that other characteristics can be used to determine when the index update component 116 should execute. The period of low database activity may be a declarative time (e.g. between 3 a.m. and 4 a.m.) or determined by current state of the system. For example, the index update component 116 executes if the storage media is currently operating at less than 50% of rated capacity, the processing units are currently operating at less than 30% of rated capacity, and there is more than 1 MB of free memory. These parameters are all observable by interrogating the state of the system.

The index update component 116 determines if the index 114 is current by comparing the state of the messaging database 112 to the state of the index 114. If the states are the same, then the index 114 is current. In one embodiment, a change number associated with the messaging database 112 and a change number associated with the index 114 are compared to determine if the index 114 is current. The change number is a unique increasing sequential number used to track transactions or database modifications 118 applied to the messaging database 112.

Database modifications 118 include additions, deletions, and changes to the messaging database 112. The database modifications 118 to the messaging database 112 are tracked and assigned a strictly increasing number to each modification (e.g. the change number). One skilled in the art will recognize there are many ways of tracking such changes, for example in one embodiment this change tracking mechanism is a physical database recovery log and in another embodiment it may be a logical events or actions table. Additionally, the database modifications 118 are arranged so that they can be efficiently retrieved in change order and in a format that records the insertion, deletion, and modification of data in the messaging database 112. In one embodiment, the database modifications 118 are formatted so they may be filtered based on a subset of the data in the messaging database 112. The subset of data is indicated by any metadata that identifies a subset of data indexed. For example, in one embodiment of the electronic messaging application 104 the metadata includes a mailbox identifier and a folder identifier within the mailbox. For other applications in other embodiments, the metadata includes a table name and an index key range within the table.

In one embodiment, an index deletion component 122 deletes indexes 114 that are not being utilized. In this embodiment, a last referenced date is associated with the index 114. The last referenced date is updated when a query referencing the index 114 is submitted to the messaging database 112. The index deletion component 122 deletes any index 114 that has not been referenced within a certain period of time. For example, suppose the messaging database 112 includes two indexes 114, I1 last referenced on Jan. 1, 2006 and I2 last referenced on Mar. 1, 2006. If the index deletion component 122 is configured to delete indexes 114 that have not been referenced in 60 days and the current data is Apr. 1, 2006, the index deletion component 122 will delete I1 and not I2. Furthermore, because the index deletion component 122 is independent of the electronic messaging application 104 and index update component 122, the index deletion component 122 can be scheduled to execute during periods of low database activity. By deleting indexes 114 that are not being utilized, system resources (e.g. disk space) are freed for other purposes. One skilled in the art recognizes that other characteristics can be used to determine when the index deletion component 122 should execute. The period of low database activity may be a declarative time (e.g. between 3 a.m. and 4 a.m.) or determined by current state of the system. For example, the index deletion component 122 executes if the storage media is currently operating at less than 50% of rated capacity, the processing units are currently operating at less than 30% of rated capacity, and there is more than 1 MB of free memory. These parameters are all observable by interrogating the state of the system.

According to another aspect of the invention, if the index 114 does not exist for the query, the index request component 124 generates an unsatisfied request record 126 to track indexes 114 that would have been utilized had they existed. An index creation component 128 creates new indexes from the unsatisfied request records 126. This allows the system to track access patterns at run-time to determine what indexes 114 are needed but do not exist. Additionally, the index creation component 128 is independent of the database query and thus, it can be executed during periods of low database activity. Advantageously, the penalty for creating an index 114 that is not utilized by a query is minimal because the index 114 will not effect system performance because it will not be updated and eventually the index 114 will deleted by the index deletion component 122. Also, no skilled human intervention is required to create the index 114. One skilled in the art recognizes that other characteristics can be used to determine when the index creation component 128 should execute. The period of low database activity may be a declarative time (e.g. between 3 a.m. and 4 a.m.) or determined by current state of the system. For example, the index creation component 128 executes if the storage media is currently operating at less than 50% of rated capacity, the processing units are currently operating at less than 30% of rated capacity, and there is more than 1 MB of free memory. These parameters are all observable by interrogating the state of the system.

Generally, the data processors of server 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components are illustrated herein as discrete blocks. It is recognized, however, that such programs and components reside at various times in different storage components of the computer, and are executed by the data processor(s) of the computer.

Figure 2:
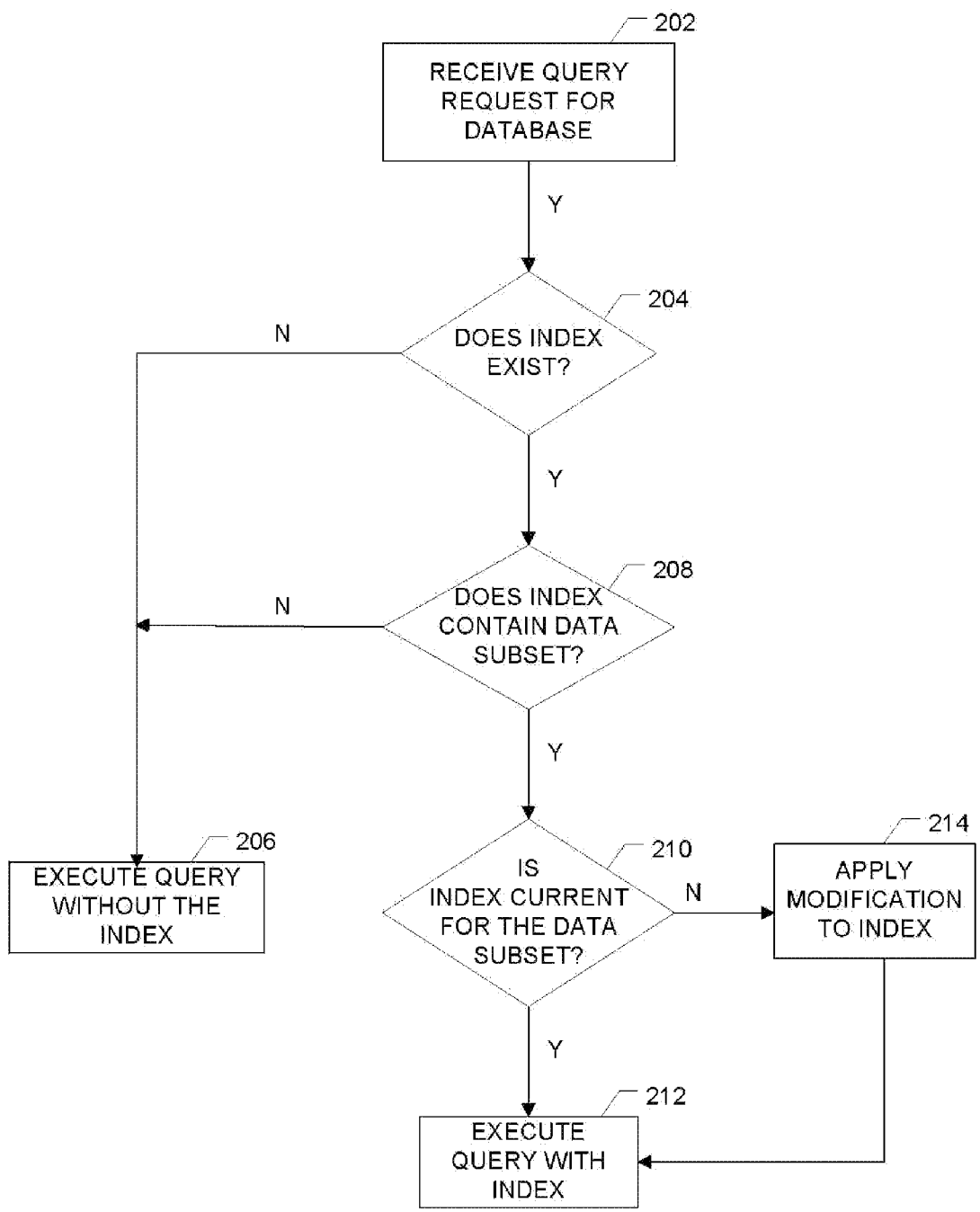
FIG. 2 is an exemplary flow diagram for one embodiment of a method for updating the index of the messaging database.

FIG. 2 is an exemplary flow diagram for one embodiment of a method for updating the indexes 114 of the messaging database 112. At 202, the electronic messaging application 104 receives a query to the messaging database 112 referencing the index 114 of the messaging database 112 from the electronic messaging client 106 or generates a query to the messaging database 112 in response to request received from the electronic messaging client 106.

At 204, a check is made to see if the index 114 exists. In one embodiment, metadata is created for each index 114 in the messaging database 112. The metadata is searched to determine if the index 114 referenced in the query exists. For notational convenience, Structured Query Language (SQL) Data Definition Language (DDL) is used to represent the following embodiment for schema for this metadata and other schema illustrated herein.

```
Create table IndexDefinition
(
    indexNum       Int;
    keyOrder       Int;
    property       Int;
    sortAscending  bit;
)
```

For example, to represent an index 114 on the message receive time and subject, the following SQL statements are executed to create two records in the IndexDefinition table:

Insert into indexDefinition values (1, 0, ptagMessageReceiveTime, true)

Insert into indexDefinition values (1, 1, ptagSubject, true)

Furthermore, one skilled in the art of databases recognizes that variations of the schema that record the same information could also be used for the metadata and other schema illustrated herein.

Figure 3:
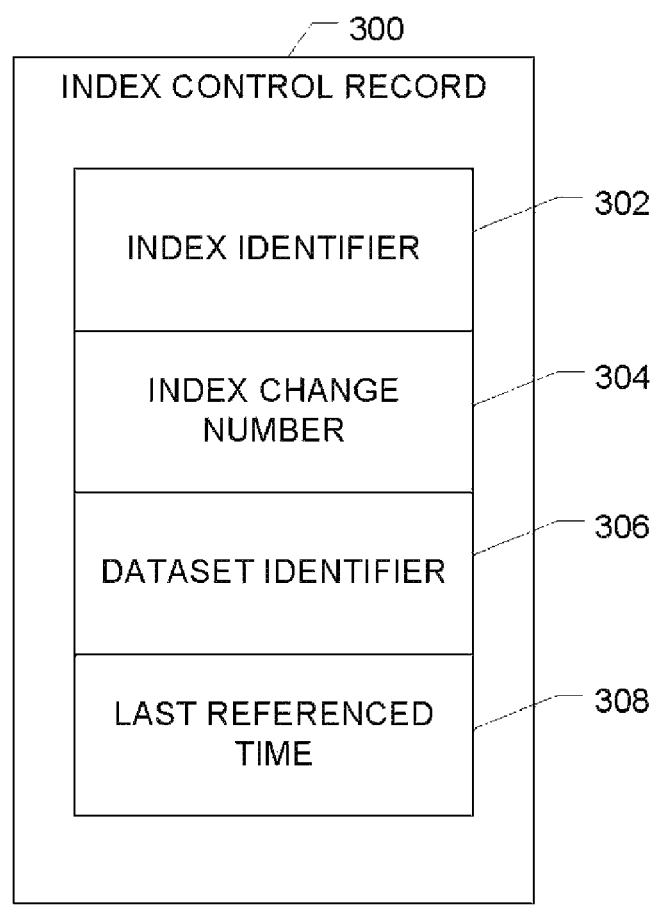
FIG. 3 is a block diagram illustrating an exemplary computer-readable medium on which aspects of the invention may be stored.

If the index 114 does not exist, the query is executed at 206 without the index 114. If the index 114 exists, in one embodiment, a check is made to determine if the index 114 contains the subset of data associated with the query at 208. In another embodiment, index control records 300 (as shown in FIG. 3) are accessed to determine if the index 114 contains the subset of data by referencing the data subset field. If the subset of data does not exist within the index 114, the query is executed without an index 114 at 206. In an alternative embodiment, an unsatisfied request 126 is generated by the index request component 124 before the query is executed.

At 210, a check is made to determine if the index 114 is current for the data subset. In one embodiment, the index 114 is not current if the change number associated with the index 114 is less than the change number associated with the messaging database 112. If the index 114 is current, the query is executed with the index 114 at 212.

If the index 114 is not current, database modifications 118 are applied to the index 114 at 214. In one embodiment, a modification corresponding to the database modification 188 is applied to the index 114. Database modifications 118 to the messaging database 112 are tracked in a sequential manner. Examples of database modifications include a reliable eventing queue, a recovery log, a change history. In general, any mechanism that tracks changes in a sequential manner, assigns a strictly increasing number to each change, allows the data to be efficiently retrieved in change order, provides the data in a form capable of being filtered, and records insertion, deletion, and modification to the messaging database 112 may be utilized. The following is one embodiment of a reliable events table in SQL DDL notation:

```
Create table reliableEvents
(
    changeNumber      bigint;
    dataSubset        int;
    changeType        tinyInt; /* insert, update, delete */
    baseDataIdentifier int;
)
```

The baseDataIdentifier field identifies the base data being changed so it can be quickly retrieved. Examples include a primary key, a record identifier, a message identifier, or any other unique way to identify the data being affected. After the database modifications 118 have been applied to the index 114, the query is executed with the index 114 at 212.

FIG. 3 is a block diagram of a computer-readable for an index control record 300 according to one embodiment of the invention. The index control record 300 is used to track the status of the indexes 114 of the messaging database 112. At least one index control record 300 is created for each index 114 of the messaging database 112. The following is one embodiment of an index control record 300 in SQL DDL notation:

```
Create table IndexControl
(
    indexNum         int;
    dataSubset       Int;
    lastUpdateCN     bigint;
    lastReferenceTime datetime
)
```

An index identifier 302 identifies the index 114 of the messaging database 112. In one embodiment, the index identifier (indexNum) in the index definition table described above corresponds to an index 114 of the messaging database 112.

The index change number 304 (lastUpdateCN) indicates the change number associated with the index 114. The index change number 304 indicates the last database modification 118 applied to the index 114 and is used to determine if the index 114 is current by comparing the index change number 304 to a change number associated with the messaging database 112. The index change number 304 is a sequential increasing number. If the change number associated with the messaging database 112 is greater than the index change number 304, the index 114 is not current. Examples of change numbers include: Messaging Application Programming Interface (MAPI) change number, log sequence number (LSN), or log relative byte offset (LRBA).

In one embodiment, the index control record 300 includes a dataset identifier 306 (dataSubset). The dataset identifier 306 is used to identify the subset of messaging database 112 data in the index 114. Any metadata to identify the subset of data indexed may be used including: a mailbox identifier and folder identifier within that mailbox; a table name and an index key range within a table; a property of the data; a comparison value and comparator; and an expression containing properties of the data, comparison values and comparators. For example, all the mail from Bob is a subset of data identified as all the messages containing a property 'from' where the value of the 'from' property is equal to 'Bob'. In another example, all the mail received between 1 p.m. and 2 p.m. yesterday containing the word 'hippo' in the subject property, routed through china, where the message was not encrypted is a subset of data identified as all messages where the receive time property is greater than 1 p.m. and less than 2 p.m., there exists a substring within the subject property matching 'hippo', where the 'route taken' property includes china, and the encrypted property is not true. Identifying a subset of messaging database 112 data allows for enhanced performance because when the index 114 is referenced, the query will be for a subset of the data and the index update component 116 will update the index 114 for the specified subset instead of the entire index 114.

In another embodiment, the index control record 300 includes a last referenced time 308 (lastReferenceTime). The last referenced time 308 indicates the last time the index 114 was referenced in the query. In one embodiment, the index deletion component 122 accesses each index control record 300 and compares the last referenced time 308 to the current date and time. If the last referenced time 308 indicates that the index 114 has not been used for a period of time, the index 114 is deleted. In the embodiment where the data subset identifier is used, the data in the index 114 for the subset set of messaging database 112 data is deleted. The index 114 itself will be deleted if no other subset of data is within the index 114.

Figure 4:
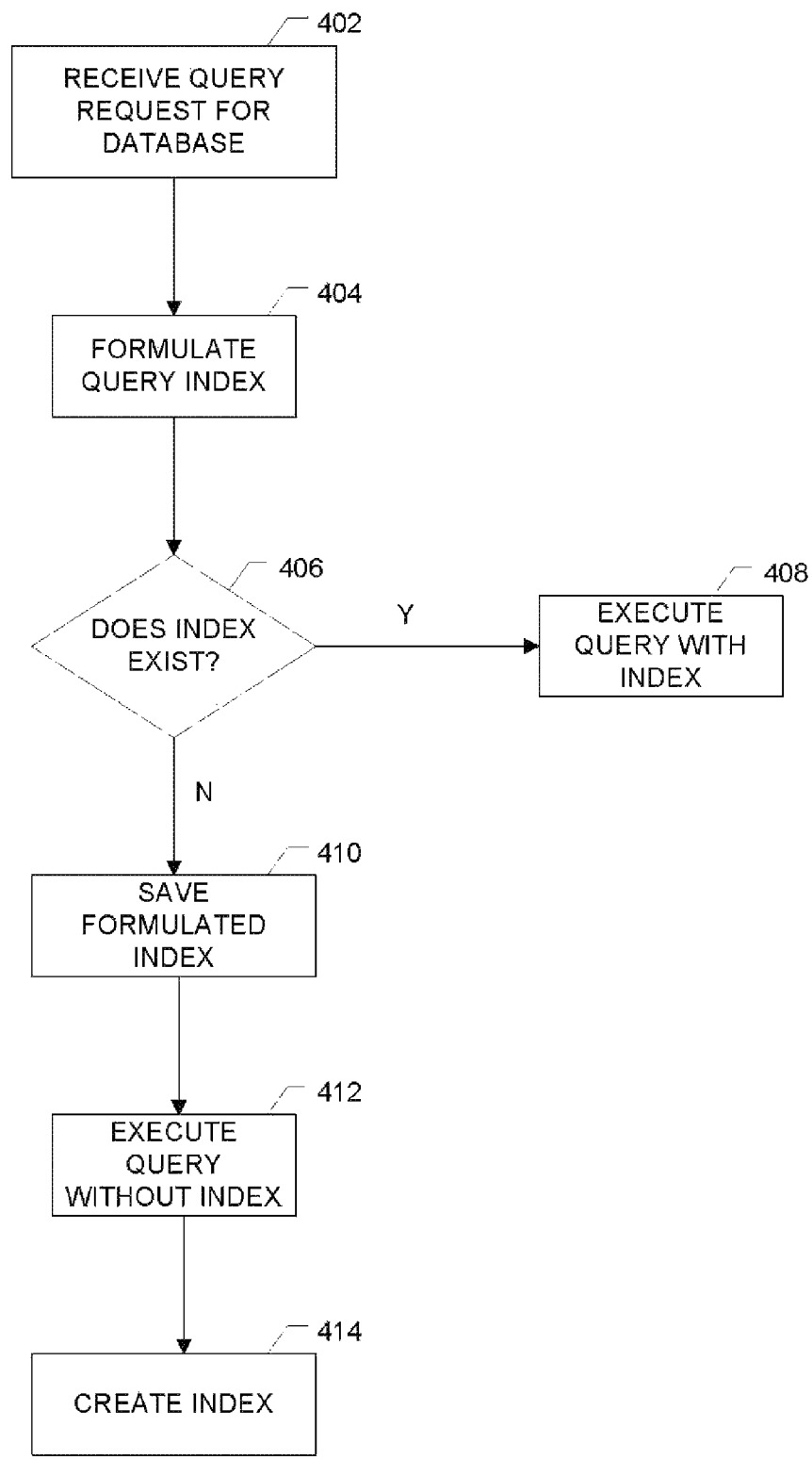
FIG. 4 is an exemplary flow diagram for one embodiment of a method for creating the index of the messaging database.

FIG. 4 is an exemplary flow diagram for one embodiment of a method for creating the index 114 of the messaging database 112. At 402, the electronic messaging application 104 receives a query to the messaging database 112. At 404, in one embodiment, the electronic messaging application 104 formulates the index for the query. In another embodiment, the received query references the index 114. In yet another embodiment, the electronic messaging application 104 generates the query to the messaging database 112 in response to a request received from the electronic messaging client 106.

At 406, a check is made to determine if the index 114 exists. In one embodiment, metadata is created for each index 114 in the messaging database 112. The metadata is searched to determine if the formulated index exists for the messaging database 112. In this embodiment, the metadata is stored in the index definition table described above.

If the formulated index exists, the query is executed at 408 with the index 114. However, if the formulated index does not exist, the formulated index is saved as an unsatisfied request record 126 at 410 so it can be tracked by the index creation component 128. The unsatisfied request record 126 includes the date and time the query would have utilized had it existed and an index definition used to define the index. In one embodiment, the unsatisfied request record 126 includes a data subset identifier as described above. In this embodiment, a check is made to determine if the formulated index exists for a subset of data associated with the request. If the formulated query exists, the query is executed with the index 114 at 408.

Figure 5:
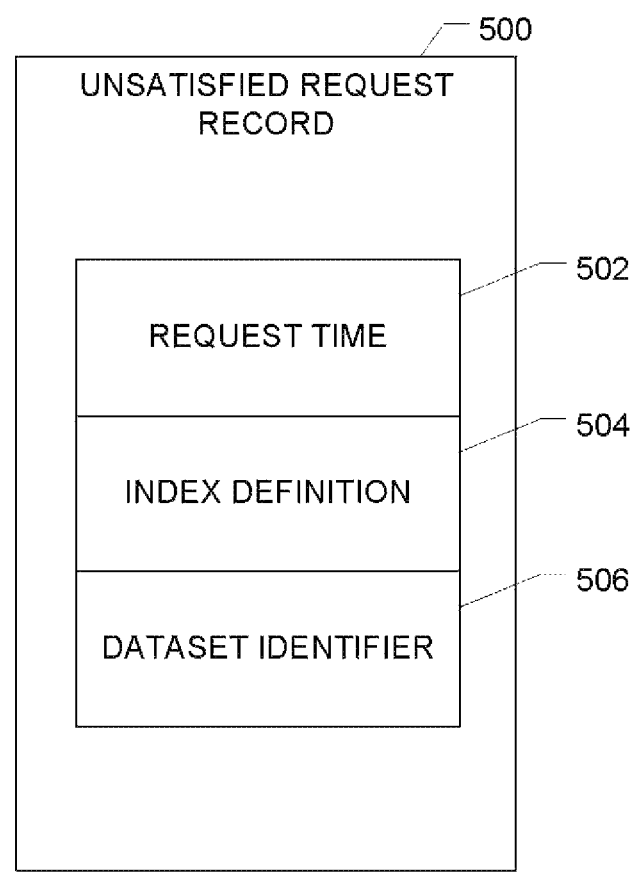
FIG. 5 is a block diagram illustrating an exemplary computer-readable medium on which aspects of the invention may be stored.

However, if the formulated index does not exist, an unsatisfied request record 126 is generated for the index 114 for the subset of the data at 410. FIG. 5 illustrates one embodiment of a computer-readable medium of the unsatisfied request record.

At 412, the query is executed without the index 114. At 414, the index 114 is created as a function of the saved unsatisfied request record 126. In one embodiment, the index 114 is created during a period of low database activity. In another embodiment, the index 114 is created when a threshold of unsatisfied request records is met. For example, the index 114 may be created if two or more unsatisfied request records 126 exist for the index 114. It should be apparent to one of average skill in the art that that are a multitude of other heuristics for selecting an optimal time to create the index 114.

FIG. 5 is a block diagram of a computer-readable for the unsatisfied request record 500 according to one embodiment of the invention. The unsatisfied request record 500 is used to track indexes 114 that could have utilized by the query if they had existed. One unsatisfied request record 500 is generated each time a query associated with an index is received and the index does not exist. The following is one embodiment of the unsatisfied request record 500 in SQL DDL notation:

```
Create table unsatisfiedRequests
(
    dataSubset      int;
    requestTime     DateTime;
    keyOrder        int;
    property        int;
    sortAscending   bit;
)
```

A Request Time field 502 (requestTime) identifies the date and time that the index would have been utilized by a query if it had existed. The Request Time field 502 allows the system to track multiple requests for the same index. It also allows the system to calculate the frequency of the request for a particular index. Both of these characteristics can be used to determine when a new index 114 should be created or the priority for creating indexes 114. For example, suppose the index creation component 128 is scheduled to execute during a three hour period of low database activity. Also, assume that the index creation component 128 is to stop after the three hour period even if all indexes 114 for the unsatisfied requests 500 have not been created. The index creation component 128 accesses the unsatisfied requests 500 and determines which index has been requested the most, and creates that index 114 first. Also, if two or more indexes have been requested the same number of times, the index creation component 128 can determine the request time 503 to determine which index was requested last and create that index first.

The Index Definition field 504 (keyOrder, property, sortAscending) contains values that allow the index creation component 128 to create the index 114 for the messaging database 112. In one embodiment, the index control record 500 includes a dataset identifier 506 (dataSubset). As described above, the dataset identifier 506 is used to identify the subset of messaging database 112 data in the index 114. When the index creation component 128 creates the index, it will populate the index 114 with data indicated by the dataset identifier 506. Further, if the index 114 already exists, the index creation component 128 will populate the index 114 with the subset of data indicated by the dataset identifier 506.

In operation, server 102 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for updating an independent index associated with a database including data in response to a query to said database, said method comprising:

receiving a request to query the database, said request referencing an existing independent index, said independent index being separate from the database and associated with the database, said independent index containing a subset of data from the database, wherein the subset is an independent copy of selected data in the database and the selected data is less than all data in the database, wherein the independent index is updated after a modification is made to the database and is not updated at the time when the modification is made to the database so that the time at which the independent index is updated is independent of the time at which the database is modified;

in response to the received request, comparing the state of the independent index to the state of the database to determine if a modification has been made to the database that has not been updated to the independent index;

in response to said comparing, determining that a modification has been made to the database that has not been updated to the independent index, and in response to said determining, updating the independent index by applying a corresponding modification to the independent index prior to the execution of the received query and updating a last referenced time indicating the time that the independent index identified by the index identifier for the subset of data was last accessed by the received query to the database;

modifying the received query to utilize the updated independent index;

executing the modified query with the updated independent index; and deleting the subset of data of the independent index identified by the index without user interaction if the last referenced time is greater than a specified period time.

2. The method of claim 1, wherein the comparing the state of the independent index to the state of the database comprises comparing a change number associated with the modification to the database and a change number associated with the independent index, said change number of the modification being a unique number associated with the modification, said change number associated with the independent index being the unique number associated with the last modification applied to the independent index.

3. The method of claim 2, wherein the change number associated with the modification is in increasing order relative to the change number of previous modifications and the independent index is updated with the modification when the change number associated with the independent index is less than the change number associated with the modification.

4. The method of claim 2, wherein the updating further comprises:

comparing the change number of the independent index to the change number of the modification;

applying the modification to the independent index if the change number of the modification is greater than the change number of the independent index, wherein the change number associated with the modification is a strictly increasing value;

modifying the change number of the independent index to the change number of the modification applied to the independent index.

5. The method of claim 1, wherein the modification is associated with one or more of the following: a transaction log, a reliable eventing queue, a recovery log and a change history.

6. The method of claim 1 further comprises updating the independent index with the modification during periods of low database activity, said updating occurring regardless of whether a query referencing the independent index was received.

7. The method of claim 1, wherein the database is associated with an electronic mail application.

8. The method of claim 1, wherein the database is updated when the modification is received and wherein the independent index is updated when the query is received.

9. The method of claim 1, wherein the query is for a subset of the data in the database and the independent index is updated with the modification if the modification is to said subset of data.

10. The method of claim 9, wherein the subset of data is identified by one or more of the following: a mailbox identifier and a folder identifier of the mailbox identifier; a table name and an index key range of the table; a property of the data; a comparison value and comparator; and an expression containing properties of the data, comparison values and comparators.

11. A computer-readable storage medium having stored thereon a data structure for an index control record associated with an independent index associated with a database including data, said index control record comprising:

an index identifier uniquely identifying an independent index, said independent index being separate from the database and associated with the database, said independent index containing a subset of data from the database, wherein the subset is a independent copy of selected data in the database and the selected data is less than all data in the database, wherein the independent index is updated after a modification is made to the database and is not updated at the time when the modification is made to the database so that the time at which the independent index is updated is independent of the time at which the database is modified;

an index change number representing a change number of the last modification to the independent index identified by the index identifier, wherein the independent index identified by the index identifier is updated as a function of the change number of the database and the index change number at a time the independent index is accessed by a received query, the change number of the database representing the last modification to the database, wherein the independent index identified by the index identifier is updated with the modifications made to the database, in response to the received query and prior to execution of the received query, as indicated by the change number of the database that have not been applied to the independent index as indicated by the index change number;

a last referenced time indicating the time that the independent index identified by the index identifier was last accessed by the query to the database;

a last referenced time indicating the time that the independent index identified by the index identifier for the subset of data indicated by the data subset identifier was last accessed by the query to the database; and wherein the subset of data of the independent index identified by the index identifier is deleted without user interaction if said last referenced time is greater than a specified period time.

12. The computer-readable storage medium of claim 11, wherein the change number associated with the modification is one or more of the following: Messaging Application Programming Interface (MAPI) change number, log sequence number (LSN), and log relative byte offset (LRBA).

13. The computer-readable storage medium of claim 11 further comprising a data subset identifier identifying a subset of database data represented within the independent index.

14. The computer-readable storage medium of claim 13, wherein the subset of data is identified by one or more of the following: a mailbox identifier, a folder identifier of the mailbox identifier, a table name and an index key range of the table.

15. A computer-readable storage medium having stored thereon computer-executable components comprising:

(a) a data structure for an index control record comprising:

(i) an index identifier uniquely identifying an independent index, said independent index being separate from a database and associated with said database, said independent index containing a subset of data from the database, wherein the subset is an independent copy of selected data in the database and the selected data is less than all data in the database, wherein the independent index is updated after a modification is made to the database and is not updated at the time when the modification is made to the database so that the time at which the independent index is updated is independent of the time at which the database is modified;

(ii) an index change number representing a strictly increasing sequential change number of the last modification to the database for the subset of data identified by the data subset identifier that is reflected in the independent index identified by the index identifier, said modification being applied to the database and to the independent index in order of the sequential change number; and (iii) a last referenced time indicating the time that the independent index identified by the index identifier was last referenced by a query to the database;

(b) an index update component for:

(i) receiving the request to query the database, said request referencing the independent index, said referenced independent index being associated with the index identifier;

(ii) searching for the index control record for the index identifier associated with the requested independent index; and (iii) in response to the received query request and prior to execution of the received query request, applying a modification to the independent index as a function of the index change number of the index control record and a change number of the database, said change number of the database indicating the last modification applied to the database;

(c) an index deletion component for:

(i) selecting zero or more index control records as a function of the last referenced time, when the last referenced time is greater than a specified period time;

(ii) for each selected index control record, deleting the independent index identified by the index identifier of the selected record.

16. The computer-readable storage medium of claim 15 further comprising a data subset identifier identifying a subset of database data represented within the independent index; and wherein a subset of data of the index identified by the data subset identifier is deleted.

17. The computer-readable storage medium of claim 15, wherein the index deletion component executes during periods of low database activity.

* * * * *